Patented Sept. 30, 1930

1,776,857

UNITED STATES PATENT OFFICE

IRVIN W. HUMPHREY, OF WHARTON, NEW JERSEY, ASSIGNOR TO HERCULES POWDER COMPANY, OF WILMINGTON, DELAWARE, A CORPORATION OF DELAWARE

RUBBER COMPOSITION

No Drawing.   Application filed October 7, 1927.  Serial No. 224,771.

My invention relates to an improvement in rubber compositions and more particularly to a rubber composition containing as an ingredient the product of the decarboxylation of rosin and which is composed chiefly of rosin oil and rosin pitch.

The substance, which I will refer to herein as decarboxylated rosin, incorporated with rubber to produce the composition in accordance with my invention may comprise only neutral rosin oil, or collophene, and pitch or it may contain also some abietic acid. For example, the substance derived from rosin which had an acid number of 150—170 may have an acid number of 10 or less or it may have an acid number as high as say 75, the acid number depending upon the conditions under which the rosin was treated.

In the preparation of the decarboxylated rosin for incorporation with rubber for the production of the composition embodying my invention either wood or gum rosin may be treated, for example, with fuller's earth and heat to effect the decomposition of the abietic acid, in whole or in part, with the splitting off of water and oxides of carbon. The resultant product, consisting of collophene, or neutral rosin oil, and rosin pitch, or of collophene, abietic acid and pitch depending upon whether the decomposition of the rosin is complete or partial is incorporated with rubber, vulcanized or unvulcanized, in various proportions in any usual incorporating apparatus, as a mixer or rolls, with or without the aid of heat. The decarboxylated rosin may be incorporated with various grades of rubber or mixtures of rubbers and will act as a softening and blending medium, will facilitate milling and will decrease the tendency of rubber compositions, in which it is an ingredient, to become hard and brittle.

In the preparation of the decarboxylated rosin, for example, 500 g. of wood rosin, having an acid number 155, to which is added 15 g. of fuller's earth is heated at a temperature of say 300° C.–325° C. for a period of about four hours under atmospheric pressure and without substantial distillation of rosin other than the distillation of about 30 g. of oil, consisting chiefly of light rosin spirit. The main reaction may perhaps be expressed as follows:—

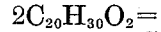
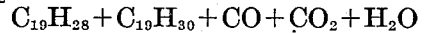

The product of the reaction, a very viscous oil having a density of 0.99–1.01, may be separated into about 265 g. of neutral rosin oil and about 140 g. of residue termed pitch. The latter differs from ordinary rosin pitch, which is produced by the destructive distillation of rosin. In the above example if the heating period be shortened, more abietic acid will be present in the product due to incomplete decomposition of the rosin.

The decarboxylated rosin may be incorporated with rubber, vulcanized or unvulcanized, in proportion within, for example, the range 1%–10%. Where the decarboxylated rosin is incorporated with unvulcanized rubber free sulphur may be added to the composition and the decarboxylated rosin will combine with part of it.

As typical examples of compositions embodying my invention the following formula will be illustrative:

Unvulcanized rubber composition

|   | Per cent |
|---|---|
| Smoked sheets | 60 |
| Decarboxylated rosin | 3.0 |
| Sulphur | 3.0 |
| Hexa | 0.5 |
| Mineral rubber | 5.0 |
| Zinc oxide | 12.5 |
| Carbon black | 16.0 |

In the preparation of the decarboxylated rosin, it will be understood that in the treatment of the wood or gum rosin various varieties of argillaceous earths, some grades of siliceous earth, as for example Filtrol, and certain grades of activated carbon, also other catalytic agents, may be used in place of or as equivalents of fuller's earth.

Having now fully described my invention, what I claim and desire to protect by Letters Patent is:—

1. A new composition of matter including rubber and decarboxylated rosin.

2. A new composition of matter including rubber and rosin which has been subjected to treatment with heat in the presence of fuller's earth.

3. A new composition of matter including rubber, rosin oil and rosin pitch.

4. A new composition of matter including rubber, neutral rosin oil, abietic acid and rosin pitch.

5. A new composition of matter including rubber with which is incorporated from about 1% to about 10% of decarboxylated rosin.

6. A new composition of matter including rubber with which is incorporated about 3% of decarboxylated rosin.

In testimony of which invention, I have hereunto set my hand at Kenvil, New Jersey, on this 4th day of October, 1927.

IRVIN W. HUMPHREY.